United States Patent
Huikku et al.

(12)

(10) Patent No.: US 6,339,136 B1
(45) Date of Patent: Jan. 15, 2002

(54) PROCESS FOR MAKING PROPYLENE HOMO OR COPOLYMERS

(75) Inventors: Sirpa Ala Huikku; Thomas Garoff, both of Helsinki; Timo Leinonen, Tolkkinen; Ali Harlin, Vantaa, all of (FI); Fred Bergmann, Langesund (NO)

(73) Assignee: Borealis A/S, Lyngby (DK)

( * ) Notice: Subject to any disclaimer, the term of this patent is extended or adjusted under 35 U.S.C. 154(b) by 0 days.

(21) Appl. No.: 09/308,040

(22) PCT Filed: Nov. 17, 1997

(86) PCT No.: PCT/FI97/00702

§ 371 Date: Jul. 13, 1999

§ 102(e) Date: Jul. 13, 1999

(87) PCT Pub. No.: WO98/22514

PCT Pub. Date: May 28, 1998

(30) Foreign Application Priority Data

Nov. 15, 1996 (FI) ................................................ 964572

(51) Int. Cl.$^7$ ............................................. C08F 110/06
(52) U.S. Cl. ...................... 526/351; 526/65; 526/124.3; 526/216; 526/903; 502/104; 502/107; 502/127
(58) Field of Search .................. 526/65, 124.3, 526/351, 903, 216; 502/107, 104, 127

(56) References Cited

U.S. PATENT DOCUMENTS

| | | | | |
|---|---|---|---|---|
| 4,214,063 A | * | 7/1980 | Luallin ...................... | 526/68 |
| 5,093,415 A | | 3/1992 | Brady, III et al. | |
| 5,234,879 A | | 8/1993 | Garoff et al. | |
| 6,084,041 A | * | 7/2000 | Andtsjo et al. ............... | 526/64 |

FOREIGN PATENT DOCUMENTS

| | | |
|---|---|---|
| EP | 0086472 | 8/1983 |
| EP | 0132893 | 2/1985 |
| EP | 0176133 | 4/1986 |
| EP | 0412750 | 2/1991 |
| EP | 0417995 | 3/1991 |
| EP | 0438068 | 7/1991 |
| FI | 70028 | 9/1986 |
| FI | 96615 | 7/1996 |
| GB | 984113 | 2/1965 |
| GB | 1077681 | 8/1967 |
| WO | 9219653 | 11/1992 |
| WO | WO 92/19658 | * 11/1992 |
| WO | 9219658 | 11/1992 |

OTHER PUBLICATIONS

Sergei A. Segeer et al., Makromo. Chem. 185, pp. 2377–2385, (1984).

Roger Spitz et al., Makromo. Chem. 190, pp. 707–716 (1989).

* cited by examiner

*Primary Examiner*—David W. Wu
*Assistant Examiner*—Ling-Siu Choi
(74) *Attorney, Agent, or Firm*—Birch, Stewart, Kolasch & Birch, LLP

(57) ABSTRACT

A process for homo or copolymerizing propylene, wherein propylene is polymerized in the presence of a catalyst at an elevated temperature in a reaction medium, in which a major part is formed by propylene. The polymerization is carried in at least one slurry reactor in the presence of liquid propylene at a temperature between 80° C. and the critical temperature of the reaction medium and a catalyst system producing within said temperature range a high productivity and essentially constant isotacticity within wide melt index range.

19 Claims, No Drawings

PROCESS FOR MAKING PROPYLENE HOMO OR COPOLYMERS

This application is the natiional phase under 35 U.S.C. §371 PCT International Application No. PCT/FI97/00702 which has an International filing date of Nov. 17, 1997 which designated the United States of America.

The invention relates to a process for making propylene polymers or copolymers in propylene medium.

BACKGROUND OF THE INVENTION

Several processes for polymerizing alpha-olefins, for example propylene, are known. Such processes where Ziegler-Natta catalysts are employed, are for example slurry polymerization carried out in a solvent such as n-hexane, bulk or slurry polymerization carried out in a liquefied alpha-olefin monomer such as propylene and gas phase polymerization carried out in a gaseous monomer such as gaseous propylene. Further, combinations of these processes are also known such as slurry polymerization followed by gas polymerization.

Gas phase processes are advantageous in that recovery and reuse of inert hydrocarbon or monomer is more simple than in slurry processes. The cost for equipment for monomer recovery and reuse is small compared to slurry processes. One disadvantage of the gas phase processes is that the monomer inside the reactor is in vapor phase and therefor the monomer concentration is relatively low compared that of slurry processes. This results in a lower reaction rate. In order to increase the polymer yield per unit weight of catalyst, it is necessary to extend the residence time in the reactor by increasing the volume of the reactor.

In a book Y. V. Kissin, Kinetics of Polyolefin Polymerization with Heterogenous Ziegler-Natta Catalyst (1981), p. 10,11,70,71,125 the influence of temperature in propylene polymerization with $TiCl_3$-based Z-N catalysts has been discussed. The active centers of catalysts have been shown to be stable up to 80° C. In a polymerization process carried out at relatively high temperatures, eg. 70–80° C. and high monomer concentration, the stage at which the rate of chain initiation and chain termination are equal, is reached early.

The overall polymer yield of such catalysts is in general low and very costly ash removal is necessary in the process.

According to EP0417995 a special catalyst for propylene polymerization at very high temperatures of 150–300° C. is disclosed. The catalyst has a typical structure which is possible with a claimed organoaluminium component and a silicon compound. However this process is not practical because the proposed polymerization temperatures are higher than the melting temperature of polypropylene.

Sergeev et al. (Macromol. Chem., 185, (1984), 2377–2385) have observed with $TiCl_4$/EB-$AlEt_3$/EB catalysts a slight increase of isotactic index when passing from 20° C. to 60° C. and a rapid decline above 70° C. Further Spitz and Guoyt (Macromol. Chem., 190 (1989), 707–716) reported for $MgCl_2$/$TiCl_4$ catalyst that the number of active centers remains constant within the range of 50–70° C. Above 80° C. the activity decreases and the catalyst is deactivated.

In many patent applications it is mentioned that higher temperatures, such as up to 100° C., could be used. However in such publications, for example EP0438068 and EP0412750, only lower temperatures of 70–80° C. are presented in the examples. Therefore, according to prior art only lower temperatures of up to 80° C. has been used.

From U.S. Pat. No. 5,093,415 it is known a high temperature (over 100° C.) process employing a special catalyst containing magnesium, titanium, halide and carboxylic acid ester containing two coplanar ester groups attached to adjacent carbon atoms. However this is a gas phase process and comparative examples at lower temperatures show activity decrease above 80° C.

Finnish patent application 954814 concerns a process for polymerizing propylene in at least one slurry reactor, where the temperature and the pressure are above the supercritical temperature and pressure of the reaction mixture. One of the main advantages of operating under supercritical conditions is that great amounts of hydrogen can be freely added to the slurry reactor because hydrogen readily dissolves into the supercritical fluid.

SUMMARY OF THE INVENTION

The present invention concerns a multistage process for homo or copolymerizing propylene, wherein propylene is polymerized in the presence of a catalyst system comprising a procatalyst component and a cocatalyst component, said procatalyst component comprising magnesium, titanium and at least one internal donor compound, at an elevated temperature in a reaction medium, in which a major part is formed by propylene. The present invention is characterized in that the polymerization is carried in at least one slurry reactor in the presence of liquid propylene at a polymerization temperature between 80–91° C. and by using a catalyst system where said internal donor compound is slightly soluble, the amount of said slightly soluble donor compound in the catalyst system being at least 1 w-%. This kind of catalyst system produces within said temperature range a high productivity and essentially constant isotacticity within wide melt index range.

According to another embodiment of the invention the catalyst system can include at least two internal donor compounds, of which one is slightly soluble internal donor compound and another internal one donor compound is easily soluble, and the amount of said slightly soluble donor compound in the procatalyst is at least 1 w-%.

DETAILED DESCRIPTION OF THE INVENTION

According to the invention it has been found that by using in propylene polymerization a catalyst system having at least one internal donor compound which is slightly soluble in eluting agents and by using this donor compound in a certain amount a highly stereospecific catalyst system is obtained which give certain performance between temperature range of 80–91° C. First, the catalyst system gives a high productivity and secondly, the catalyst system gives relatively high isotacticity index, which remains essentially constant although polymers have varying melt index. With ordinary Ziegler-Natta catalysts the isotacticity index is at a lower level and drops when the melt index increases.

Examples of the catalyst systems, which are usable according to the invention, among others, are generally disclosed for example in Finnish patents FI86866, FI96615, FI88047, FI88048 and Finnish patent application FI963707. These catalysts have been presented for use only in relatively low temperatures.

According to this invention a suitable catalyst system comprises a procatalyst composition prepared from magnesium dichloride, titanium compound and at least one internal donor compound having a slight solubility in hydrocarbons or compounds used as cocatalyst, and a conventional cocatalyst compound. According to one embodiment of the invention the procatalyst composition is obtained by applying transesterification method, which is generally disclosed for example in Finnish patent 88048. The transesterification reaction is carried out at an elevated temperature between a lower alcohol and a phthalic acid ester, whereby the ester groups from lower alcohol and phthalic acid change their place.

$MgCl_2$ can be used as such or it can be combined with silica, e.g. by absorbing the silica with a solution or slurry containing $MgCl_2$. The lower alcohol used can be preferably methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is halide or oxyhalide, an organic metal halide, or a purely metal organic compound, in which only organic ligands have been attached to the transition metal. Particularly preferable are the titanium halides, especially $TiCl_4$. Preferably the titanation is carried out in at least two steps.

The transesterification can be carried out e.g. by selecting a phthalic acid ester—a lower alcohol pair, which spontaneously or by the aid of a catalyst, which does not damage the procatalyst composition, transesterifies the catalyst at an elevated temperatures. It is preferable to carry out the transesterification at a temperature, which is between 110–150° C., preferably between 115–140° C.

The alkoxy group of the phthalic acid ester used comprises at least five carbon atoms, preferably at least 8 carbon atoms. Thus, as the ester can be used for example propylhexyl phthalate, dioctyl phthalate, di-nonyl phthalate, di-isodecyl phthalate, di-undecyl phthalate, di-tridecyl phthalate or di-tetradecyl phthalate.

According to the invention the slightly soluble internal donor compound is a $C_1$–$C_6$ alkyl ester of organic carboxyl acid, preferably $C_1$–$C_6$ alkyl ester of organic dicarboxyl acid and most preferably diethyl phthalate. It is very difficult to elute diethyl phthalate from solid catalyst with solvents or eluents. The reason may be that small alkyl groups of the phthalate, i.e. ethyl groups, do not solvate easily with hydrocarbon or hydrocarbon containing solvents. Thus the slightly soluble internal donor is not removed when the procatalyst compound is treated with eluents or cocatalyst compositions and therefore the stereospecifity remains also at high polymerization temperatures.

Eluents are organic and metalloorganic compounds such as compounds of Group 1, 2 or 3 metals containing $C_1$–$C_{10}$ alkyls. Preferably, the eluent is a metal compound containing $C_1$–$C_{10}$ alkyls, which are used also as a cocatalyst. The preferable eluent is tri-$C_1$–$C_6$-alkylaluminium, more preferably tri-$C_1$–$C_4$-alkylaluminium, most preferably triethylaluminium.

According to one embodiment of the invention propylene is polymerized in the presence of a catalyst system comprising a procatalyst component and a cocatalyst component, said procatalyst component comprising magnesium, titanium and at least two internal donor compounds, at an elevated temperature in a reaction medium, in which a major part is formed by propylene, whereby the polymerization is carried in at least one slurry reactor in the presence of liquid propylene at a polymerization temperature between 80–91° C. and by using a catalyst system in which one of said internal donor compounds is slightly soluble and another internal donor compound is easily soluble, the amount of said slightly soluble donor compound in the catalyst system being at least 1 w-%. In other words, if transesterification method is used, said transesterification reaction is carried out only partly.

Said internal donor compounds are preferably brought in the procatalyst composition together with the titanium component. The titanation of the procatalyst composition is carried out at least twice. During the first titanation the molar ratio of the added phthalic acid ester and magnesium halide is preferably equal or greater than 0.1. During the second titanation the molar ratio of the added phthalic acid ester and magnesium halide is 0–0.3. If during the second titanation no phthalic acid ester is added, then further titanation steps are not necessary. However, if phthalic acid ester is added during the second titanation, the third or possibly more titanation steps are necessary.

The procatalyst composition is used together with an organometallic cocatalyst, like aluminium trialkyl, and preferably with an external donor, such like cyclohexyl methylmethoxy silane or dicyclo pentyldimethoxy silane.

The catalyst can also be prepolymerized prior to feeding into polymerization reactor. In the prepolymerization the catalyst components are contacted for a short period with a monomer before feeding to the reactor.

The transesterification method provides a convenient way to bring in the procatalyst composition at least one slightly soluble internal donor. However, any other methods can be used to bring in the procatalyst composition at least one internal donor compound, in an amount of at least 1 w-% is a slightly soluble internal donor compound.

The process described above makes it possible to produce polypropylenes having a molecular weight and melt index varying from low to very high and at the same time maintaining a high isotacticity index. A greater amount of polymer can be achieved by catalysts according to the invention compared to the traditional catalysts or greater production by volume can be achieved from the same reactor volume. The products have high elasticity or high crystallinity and high flexural modulus.

According to one embodiment of the invention the process comprises only one slurry reactor, which is operated at a temperature between 80° C. and the critical temperature of the reaction mixture. This means that the temperature is generally between 80° C. and 91° C. The pressure has no upper limit, but for practical reasons the preferable pressures are in the range of 46–70 bar, preferably 50–70 bar.

The polymerization is carried out by feeding a catalyst system, a mixture of propylene acting as reaction diluent and optional hydrogen and comonomer into the slurry reactor. The polymerization heat is removed by cooling the reactor by cooling jacket. The residence time in the slurry reactor must be at least 15 minutes, preferably 20–100 min for obtaining a sufficient degree of polymerization. This is necessary to achieve polymer yields of over 40 kg PP/g cat.

According to one embodiment of the invention, light inert hydrocarbons are fed to the reactor. Examples of such hydrocarbons are iso-butane, n-butane and isopentane. The light, inert hydrocarbon in the polymerization mixture lowers the pressure required in the reactor. The increased catalyst activity at relatively high temperature compensates the decreased activity due to lowered concentration of propylene.

If lower molecular weight polypropylene is the desired product hydrogen can be fed into the reactor. Hydrogen can be added in the reactor 0.001–100 mol $H_2$/kmol propylene, preferably in the range of 1.5–15 mol $H_2$/kmol propylene.

Comonomers can be added into the reactor in any desired amount, preferably 0–20% of the monomer feed. Ethylene, butylene and hexene, among others, can be used as comonomers for the manufacture of polymers for blow molding sheets, pipe and film.

According to a preferable embodiment of the invention, it comprises two slurry reactors, which are operated at a temperature of 80–91° C. The dual reactor system is used because it decreases the possibility that catalyst particles move unreacted to the second reactor. This would cause gels or difficulties in downstream because of high catalyst activity. The pressure can be between within the range of 35–70 bar, while preferably it can be less, eg. 40–60, if light hydrocarbons are added into the reaction mixture. Hydrogen can be present in the amount of 0–15 mol/kmol propylene feed, preferably 0–3 mol/kmol propylene. Because the polymerization temperature is high, the molecular weight distribution tend to be narrow, but can be controlled broad in two reactors by varying hydrogen concentration in different reactors. The residence time can be varied for example between 15–100 min such that the residence time in the second reactor can be the same or up to three times as that in the first reactor. This means that the reactor volume of the second reactor can likewise be the same or up to three times as that of the first reactor.

Hydrogen can be added in the second reactor at 0.001–100 mol $H_2$/kmol propylene, preferably in the range of 1.5–15 mol $H_2$/kmol propylene. The amount of hydrogen into the second reactor can be equal to or higher than that of the first reactor.

According to one preferable embodiment of the invention, two sequential loop reactors are used and the polymerization temperature in the first reactor is lower than in the second reactor. The polyme rization activity of the catalyst decreases in the first loop reactor, but this effect can be compensated in the second reactor due to higher temperature.

Comonomers can be added into the first reactor and second reactor in any desired amount, preferably 0–20% of the monomer feed. Ethylene, butylene and hexene, among others, can be used as comonomers for the manufacture of polymers for blow molding, sheets, pipe and film.

By this way propylene polymers having a broad or bimodal molecular weight distribution can be produced. The polymers have a high flexural modulus of 1700–2100 MPa.

If polymers having a broad or very broad or bimodal molecular weight distribution is desired, the slurry reactor or reactors can be followed by a gas phase reactor or reactors. By this way, higher comonomer contents can be used and multimodal products achieved. The polymerization in the gas phase can be carried out at a temperature of 60–100° C. and in the pressure of 10–40 bar. It is desirable that no hydrogen or a minor amount of hydrogen is fed into the gas phase reactor. If hydrogen is applied, it is optionally removed from the reaction mixture before feeding the polymer into the gas phase reactor. This can be done by ordinary means, for example by cyclone separators or other suitable flash tank.

In this way high impact resistant products having a raised stiffness can be produced.

The invention is further illustrated by the following non-limiting examples.

EXAMPLES 1a–1d

The procatalyst used in Examples 1a–1d was made according to Finnish patent 88048. Two titanations were carried out. In the first titanation the ratio of donor (dioctyl phthalate) to magnesium was 0.15 (mol/mol). In the second titanation no donor was used. The procatalyst contained 2.0 w-% of Ti, 15.2 w-% of Mg, 0.7 w-% of DOP (dioctylphthalate) and 6.2 w-% of DEP (diethylphthalate).

Propylene was polymerized in stirred-tank reactor having a volume of 5 l. About 0.6 ml triethyl aluminium (TEA) as a cocatalyst, ca. 0.2 ml of 25 v % solution of cyclohexyl dimethoxy silane (CHMMS) in n-heptane as an external donor and 30 ml of n-heptane were mixed and allowed to react for five minutes. Half of the mixture was added to the reactor. Al/Ti mole ratio was 500 and Al/external donor was 20 (mol/mol). 70 mmol of hydrogen and 1400 g of propylene were introduced into the reactor and the temperature was raised within 15–30 minutes to a desired polymerization temperature. The polymerization time was 60 minutes, after which the polymer formed was taken out from the reactor.

The polymerization conditions used are presented in Table 1 below.

TABLE 1

Polymerization conditions

| Example | Polymerization temperature ° C. | Amount of catalyst mg | TEA ml | CHMMS ml | Time to reach polymerization temperature min | Yield g |
|---|---|---|---|---|---|---|
| 1 a | 70 | 24 | 0.68 | 0.2 | 15.5 | 773 |
| 1 b | 80 | 20 | 0.57 | 0.17 | 23 | 1012 |
| 1 c | 85 | 20.6 | 0.59 | 0.17 | 26 | 1018 |
| 1 d | 90 | 20.7 | 0.59 | 0.17 | 33 | 1002 |

EXAMPLE 2a–2d

The procatalyst used in Examples 2a–d was made according to FI963707. Three titanations were carried out. In the first titanation the ratio of the donor (dioctyl phthalate) to magnesium was 0.15 (mol/mol). In the second titanation the donor/Mg ratio was 0.10 (mol/mol). In the third titanation no donor was used. The procatalyst contained 2.5 w-% of Ti, 14.8 w-% of Mg, 6.9 w-% of DOP and 6.2 w-% of DEP.

The polymerization was carried out as in Example 1.

TABLE 2

Polymerization conditions of Example 2

| Example | Polymerization temperature ° C. | Amount of catalyst mg | TEA ml | CHMMS ml | Time to reach polymerization temperature min | Yield g |
|---|---|---|---|---|---|---|
| 2 a | 70 | 19.8 | 0.71 | 0.21 | 19.5 | 825 |
| 2 b | 80 | 16.9 | 0.60 | 0.18 | 23 | 944 |
| 2 c | 85 | 18.5 | 0.66 | 0.19 | 25 | 916 |
| 2 d | 90 | 21,0 | 0.75 | 0.22 | 28 | 941 |

EXAMPLES 3a–3d

The procatalyst used in Examples 3a–d was made according to FI963707. Three titanations were carried out. In the first titanation the ratio of the donor (dioctyl phthalate) to magnesium was 0.10 (mol/mol). In the second titanation the donor/Mg ratio was 0.175 (mol/mol). In the third titanation no internal donor was added. The procatalyst contained 2.7 w-% of Ti, 17.8 w-% of Mg, 11.9 w-% of DOP and 1.9 w-% of DEP.

The polymerization was carried out as in Example 1.

TABLE 3

Polymerization conditions of Example 3

| Example | Polymerization temperature °C. | Amount of catalyst mg | TEA ml | CHMMS ml | Time to reach polymerization temperature min | Yield g |
|---|---|---|---|---|---|---|
| 3 a | 70 | 19.7 | 0.76 | 0.22 | 17 | 1076 |
| 3 b | 80 | 16.1 | 0.62 | 0.18 | 22 | 1110 |
| 3 c | 85 | 17.8 | 0.69 | 0.20 | 25 | 1090 |
| 3 d | 90 | 18.2 | 0.70 | 0.20 | 29 | 1027 |

Comparison Example 1a–1d

The comparison catalyst was prepared according to EP 0045 977. Essentially no transesterification took place at the titanation temperature used in the preparation of this procatalyst. In other words, the added internal donor in the activated procatalyst was essentially the same also after the titanation treatment. The procatalyst contained 2.4 w-% of Ti, 9.0 w-% of diisobutyl phthalate (DiBP) and only 0.1 w-% of transesterified donor DEP.

The polymerization conditions used are presented in the following Table 4.

TABLE 4

Polymerization conditions used in comparative examples 1a–1d

| Example | Polymerization temperature °C. | Amount of catalyst mg | TEA ml | CHMMS ml | Time to reach polymerization temperature min | Yield g |
|---|---|---|---|---|---|---|
| 1 a | 70 | 15.9 | 0.54 | 0.16 | 15 | 604 |
| 1 b | 80 | 18.0 | 0.62 | 0.18 | 24 | 840 |
| 1 c | 85 | 18.1 | 0.62 | 0.18 | 25 | 757 |
| 1 d | 90 | 17.9 | 0.61 | 0.18 | 28 | 495 |

The results of polymerizations are presented in Table 5. Melt index was measured according to ISO 1133:1991. Isotacticity index was measured by extracting with boiling n-heptane for 1 hr in Kumagawa glass extractor. Isotacticity index is n-heptane insoluble material of polymer calculated as w-%.

TABLE 5

Results of test polymerizations

| Example | Polymerization temperature °C. | Activity kgPP/ g cat h | Activity kg PP/g Ti | MFR$_2$ g/10 min | Bulk density kg/m$^3$ | Isotactic index % |
|---|---|---|---|---|---|---|
| 1 a | 70 | 32.2 | 1610 | 5.6 | 380 | 98.0 |
| 1 b | 80 | 50.6 | 2530 | 8.9 | 410 | 97.5 |
| 1 c | 85 | 49.4 | 2471 | 12.3 | 420 | 97.8 |
| 1 d | 90 | 48.4 | 2420 | 17.9 | 400 | 98.8 |
| 2 a | 70 | 41.7 | 1667 | 4.5 | 430 | 97.3 |
| 2 b | 80 | 55.9 | 2234 | 8.9 | 500 | 97.9 |
| 2 c | 85 | 49.5 | 1981 | 11.9 | 490 | 97.5 |
| 2 d | 90 | 44.8 | 1792 | 16.7 | 510 | 97.4 |
| 3 a | 70 | 54.6 | 2022 | 8.9 | 470 | 97.2 |
| 3 b | 80 | 68.9 | 2553 | 14.8 | 470 | 97.4 |
| 3 c | 85 | 61.2 | 2268 | 22.1 | 470 | 97.0 |
| 3 d | 90 | 56.4 | 2090 | 34.2 | 460 | 97.0 |
| Comp. 1a | 70 | 38.0 | 1583 | 9.4 | 470 | 95.6 |
| Comp. 1b | 80 | 46.7 | 1944 | 15.1 | 470 | 96.2 |
| Comp. 1c | 85 | 41.8 | 1743 | 22.8 | 460 | 95.6 |
| Comp. 1d | 90 | 27.2 | 1152 | 36.0 | 460 | 93.1 |

The results presented in Table 5 clearly show that with the catalysts according to the invention it is possible between temperature interval of 80–90° C. to polymerize propylene with a catalyst activity remaining at rather high level, whereas with ordinary Ziegler-Natta catalysts the activity decreases from about 46 kg PP/g cat h to 27 kg PP/g cat h. The isotacticity index is with the inventional catalysts essentially at a constant and high level in spite of increasing temperature, whereas with the comparison catalyst the isotacticity index is at a lower level and decreases when temperature increases. The melt index level with comparison catalyst increases with temperature increasing, but this happens at a cost of isotacticity index. Instead, with the inventional catalyst the melt index increases, but isotacticity index remains at about the same level.

The following examples and comparison examples show that it is possible to achieve more polymer from the same amount of catalyst according to the invention.

EXAMPLE 4

A loop-loop cascade of volume 79 m$^3$ is producing 150000 t/y meaning 18.75 t/h. The loops have identical design with a volume of 39.5 m$^3$, cooling area 244 m$^2$, diameter 0.6 m and specific area 5.67 m$^2$/m$^3$. The overall heat transfer coefficient is 1200 W/m$^{2°}$ C., which is typical measured value in loop reactors with propylene bulk or propane slurry. The specific heat capacity of the cooling jacket water is 1.16 Wh/kg° C. and cooling water flow is 900 m$^3$/h. Cooling capacity is not limiting the cases and therefore left out calculations.

The feed temperature is 25° C. containing 90% of propylene and the rest propane and possible hydrogen for MFR control. The minimum cooling water inlet temperature to the cooling jacket is set to 37° C. This water is cooled by water with inlet temperature of 27° C. This gives a minimum temperature difference of 10° C. The mileage (catalyst productivity) is based on the formula Mileage=A*(residence time)$^B$(propylene concentration), and for coefficient A the value is 1531 and 2139 at actual polymerization temperatures 70° C. and 90° C. respectively, and the coefficient B is 0.744. The heat of reaction is 557 Wh/kg.

EXAMPLE 4a

The conversion in loop-loop reactor cascade desribed above is calulated to be 50% conversion in both reactors.

The polymerization temperature is 70° C. in the first reactor and 90° C. in the second. This means production rate of 62.3 and 37.7% of total production in the first and second loop respectively. The total production is 18.75 t/h and the respective catalyst feed is 0.746 kg/h. The mileage is 39411 kgPP/kg cat with residence time of 91.2 min.

EXAMPLE 4b

The conversion in loop-loop reactor cascade desribed above is calulated to be 35% and 50% conversion in the first and the second loop respectively. The polymerization temperature is 70° C. in the first reactor and 90° C. in the second. This means production rate of 55.4 and 44.4% of total production in the first and second loop respectively. The total production is 18.75 t/h and the respective catalyst feed is 0.522 kg/h. The mileage is 35876 kgPP/kg cat with residence time of 74.5 min.

EXAMPLE 5a (Comparison)

The conversion in loop-loop reactor cascade desribed above is calulated to be 50% conversion in both reactors. The polymerization temperature is 70° C. in both reactors. This means production rate of 68 and 32% of total production in the first and second loop respectively. The total production is 18.75 t/h and the respective catalyst feed is 0.555 kg/h. The mileage is 33816 kgPP/kg cat with residence time of 86.5 min.

Thus the mileage in Example 4a is 16.5% higher than in Comparison example 5a, meaning also respective direct catalyst savings.

EXAMPLE 5b (Comparison)

The conversion in loop-loop reactor cascade desribed above is calulated to be 35% and 50% conversion in the first and the second loop respectively and both at 70° C. Lowering the conversion in the first loop is possible, eg. with increased propylene feed. This means production rate of 68% and 32% of total production in the first and second loop respectively. The total production rate is 18.75 t/h and the respective catalyst feed is 0.623 kg/h. The mileage is 30126 kgPP/kg cat with residence time of 70.7 min.

Thus the mileage in Example 4b is 19.1% higher than in Example 5b. Also it is easier to reach a close 50/50 production split in Example 4b than in the in comparison example 5b.

EXAMPLE 6

The conversion in the loop-loop cascade desribed above is calculated to be 50% conversion in both reactors at 90° C. This means production rate of 68% and 32% of total production in the first and second loop respectively. The total production rate is 18.75 t/h and the respective catalyst feed is 0.463 kg/h. The mileage is 40483 kgPP/kg cat with residence time 70.3 min.

What is claimed is:

1. A process for homo or copolymerizing propylene, wherein propylene is polymerized in the presence of a catalyst system comprising a procatalyst component and a cocatalyst component, said procatalyst component comprising magnesium, titanium and at least one internal donor compound, at an elevated temperature in a reaction medium, in which a major part is formed by propylene, wherein the polymerization is carried in at least one slurry reactor in the presence of liquid propylene at a polymerization temperature between 80° C. and the critical temperature of the reaction medium and by using a catalyst system where said internal donor compound is slightly soluble, the amount of said slightly soluble donor compound in the catalyst system being at least 1 wt %.

2. A process according to claim 1, wherein said procatalyst component comprises magnesium chloride, a titanium compound, a lower alcohol and an ester of phthalic acid, wherein said lower alcohol and said phthalic acid ester has been reacted to form said slightly soluble internal donor compound.

3. A process according to claim 2, wherein said reaction is a transesterification.

4. A process according to claim 2, wherein the lower alcohol is methanol or ethanol and the ester is propylhexyl phthalate, dioctyl phthalate, di-nonyl phthalate, di-isodecyl phthalate, di-undecyl phthalate, di-tridecyl phthalate or di-tetradecyl phthalate, and the transesterification is carried out at the temperature of 110–150° C.

5. A process according to claim 2, wherein said internal donor compound is diethyl phthalate.

6. A process according to claim 2, wherein said internal donor compound is brought into the procatalyst component in titanation together with the titanium compound.

7. A process according to claim 6, wherein said titanation is carried out at least twice.

8. A process according to claim 7, wherein during the first titanation the molar ratio of added phthalic acid ester and magnesium halide is equal or greater than 1 and during the second titanation the molar ratio of added phthalic acid ester and magnesium is between 0 and 0.3.

9. A process according to claim 1, wherein propylene is polymerized at a temperature between 80–91° C. in the presence of a catalyst system comprising a procatalyst component and a cocatalyst component, said procatalyst component comprising magnesium, titanium and at least two internal donor compounds, one of said internal donor compounds being slightly soluble and one of said internal donor compounds being easily soluble, whereby the amount of said slightly soluble donor compound in the catalyst system being at least 1 w-%.

10. Process according to claim 1, wherein it comprises two loop reactors in series, where the polymerization temperature at the second reactor is higher than in the first reactor.

11. Process according to claim 10, wherein light hydrocarbons are added to one or both the reactors in order to decrease the polymerization pressure.

12. Process according to claim 1, wherein the catalyst has an activity over 1500 kgPP/g Ti between said temperature interval.

13. A process according to claim 1, wherein the propylene homo- or copolymer has an isotacticity of at least 97%, and the melt index being at least 5.

14. A process according to claim 1, wherein the catalyst components are precontacted before feeding into the reactor.

15. A process according to claim 14, wherein the catalyst is prepolymerized with propylene at a temperature of 0–80° C. before feeding into the reactor.

16. A process according to claim 1, wherein comonomers are added into the polymerization.

17. Process according to claim 11, wherein the light hydrocarbons are isobutane, n-butane or isopentane.

18. A process according to claim 16, wherein the comonomers are ethylene or butylene.

19. A process according to claim 1, wherein the internal donor compound is slightly dissolved in a hydrocarbon solvent or compounds used as the cocatalyst.

* * * * *